United States Patent [19]
Davidsson

[11] Patent Number: 5,988,072
[45] Date of Patent: *Nov. 23, 1999

[54] PRODUCT CARRIER FOR SENSITIVE PRODUCTS

[75] Inventor: Mikael Davidsson, Långhult, Sweden

[73] Assignee: Eton Construction AB, Sweden

[ * ] Notice: This patent issued on a continued prosecution application filed under 37 CFR 1.53(d), and is subject to the twenty year patent term provisions of 35 U.S.C. 154(a)(2).

[21] Appl. No.: 08/875,301

[22] PCT Filed: Dec. 20, 1995

[86] PCT No.: PCT/SE95/01550

§ 371 Date: Oct. 3, 1997

§ 102(e) Date: Oct. 3, 1997

[87] PCT Pub. No.: WO96/22709

PCT Pub. Date: Aug. 1, 1996

[30] Foreign Application Priority Data

Jan. 23, 1995 [SE] Sweden ................................... 9500214

[51] Int. Cl.$^6$ ..................................................... B61B 3/00
[52] U.S. Cl. .............................................. 105/148; 104/89
[58] Field of Search ..................................... 105/148, 150, 105/154, 155; 104/89, 93, 94, 95; 223/85

[56] References Cited

U.S. PATENT DOCUMENTS

| | | | |
|---|---|---|---|
| 1,483,058 | 1/1924 | Frank . | |
| 3,085,724 | 4/1963 | Wilde . | |
| 3,580,183 | 5/1971 | Nearman | 104/94 |
| 3,759,190 | 9/1973 | Harvey | 105/150 |
| 3,926,303 | 12/1975 | McCall | 104/89 |
| 4,142,814 | 3/1979 | Sanchez | 404/7 |
| 4,313,397 | 2/1982 | Markum | 104/89 |
| 5,076,446 | 12/1991 | Simmerman et al. | 104/89 |
| 5,127,559 | 7/1992 | Freer et al. . | |
| 5,154,122 | 10/1992 | Goldschmidt | 104/93 |

FOREIGN PATENT DOCUMENTS 373097  1/1975  Sweden .

*Primary Examiner*—S. Joseph Morano
*Attorney, Agent, or Firm*—Lerner, David, Littenberg, Krumholz & Mentlik, LLP

[57] ABSTRACT

A product carrier for carrying products includes a suspending member for suspending said products, a transporting device for transporting the suspending member in a direction of travel, a protecting plate associated with the suspending member for protecting the products, and a spacer element projecting from the protecting plate for maintaining the protecting plate in a spaced relation from an adjacent product carrier so as to protect the product from the adjacent product carrier.

9 Claims, 1 Drawing Sheet

PRODUCT CARRIER FOR SENSITIVE PRODUCTS

TECHNICAL FIELD

The present invention relates to a product carrier for sensitive products or for products which easily become entangled in each other, which product carriers are intended to be suspended in a typical sloping track in the form of a rail, rod or the like. The products which are to be hung in the product carrier may be of any kind which is suspendable and they are not limited to any special field. The invention is particularly intended for sensitive products but also non-sensitive products can be hung in the product carrier.

PRIOR ART

When different products are produced it is usual that the product or parts thereof in a resulting end product are treated in different machines or at different working stations whereupon the treated object is hung in a product carrier which may slide, roll or be transported forward to a new working place or to a packing station. It is often so that the suspending track is slightly sloping down towards a working station and the articles will therefore be crushed against each other before the working station if several articles are present on the transport track, which is usual. Examples of such articles which may be hung in a product carrier of this kind are finished or semi-finished sewn items in the form of dresses, suits or the like, rolls of cable, car parts, etc., which are products of completely different kinds.

TECHNICAL PROBLEM

When the articles which are carried forward on a usually sloping track are held up, for example in front of a working station or a packing station, queues of the products are usually formed which will press against each other to a greater or lesser extent depending on their weight or the force in the transporting arrangement which pushes the products forward. This is a great disadvantage for sensitive products which cannot stand up to being pressed together. Another disadvantage besides that the article may be sensitive to being crushed, is that the transporting forward or the releasing of the first product article in the queue is obstructed when the articles behind are pressing on the article in question. Some articles also have a tendency to become entangled in each other if they come in touch with each other and hard products may damage each other if they bump against each other without any shock absorbant.

SOLUTION

It has, therefore, long been a desire to solve this problem in a simple way and on the one hand to be able to protect sensitive products, and on the other hand to facilitate the release or the transport forward of the first article in the row. Therefore, according to the present invention a product carrier for sensitive products has been brought about, which is intended to be suspended in a usually sloping track by means of a wheel arrangement or the like, which product carrier is characterized in that it comprises a plate on or in the vicinity of which the article is intended to be suspended and possibly one spacer on the plate preferably above the suspending point of the suspended article.

According to the invention, it is suitable that the product carrier comprises an uppermost part in contact with the wheel arrangement or the like, which uppermost part has the shape of a downward hanging rod which ends in a suspension arrangement, for example a hook at its lower end above or in which hook the plate and the spacer are fastened or suspended.

Further, according to the invention it is suitable that one or more hooks or the like are arranged on the plate having holes for further suspension of articles or clamping of, for instance, thread-shaped material. Hook and loop fastening may also occur.

The spacer may, according to the invention, suitably consist of, for example, foam plastics and it may be glued to the plate.

DESCRIPTION OF THE FIGURES

In the following the invention will be described more in detail in connection with the attached drawings where.

PREFERRED EMBODIMENT

Figure 1:
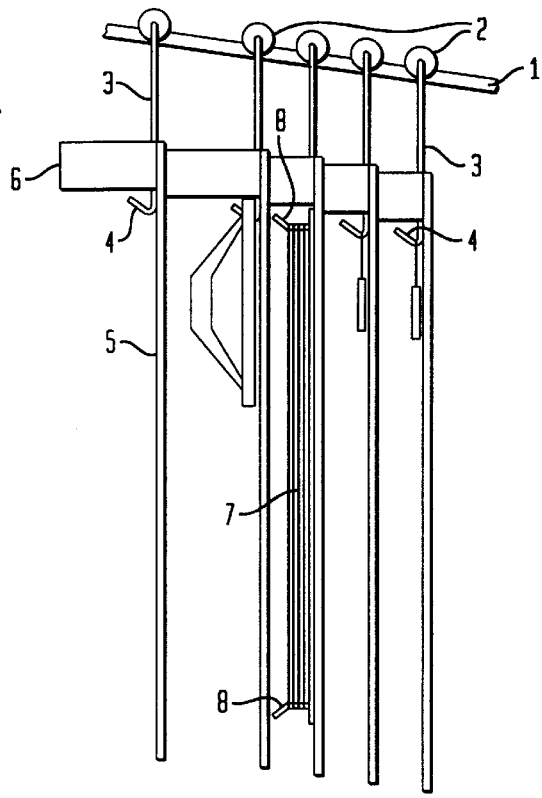
FIG. 1 shows a side view of a row of product carriers suspended on a sloping rail and where

FIG. 1 shows a transport track 1 which in the present case consists of a bar. This bar 1 may instead consist of a rail of a suitable kind. Five product carriers are suspended on the bar 1 by means of a wheel arrangement 2. In the present case the wheel arrangement 2 consists of two parallel wheels united by an intermediate shaft. The wheel arrangement 2 rides on the bar 1. It is not driven but rolls freely on the bar 1 since this slopes somewhat, but the wheel arrangement may also be driven forward in some way and the bar 1 or the track may be horizontal or rising upwardly.

Figure 2:
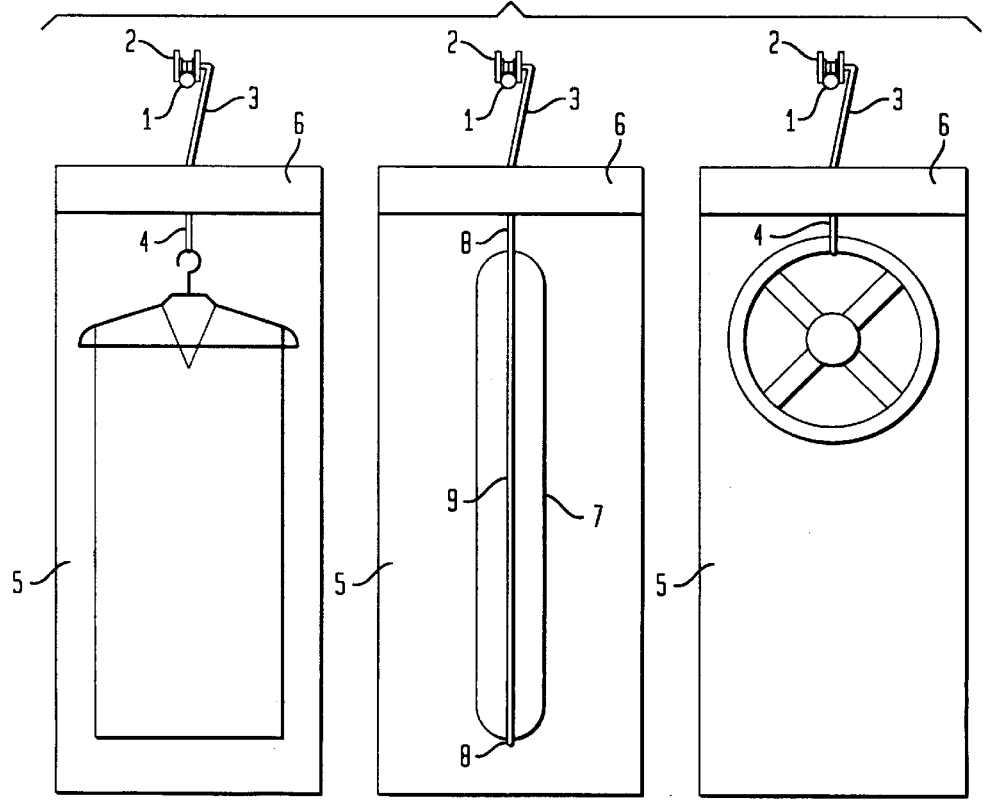
FIG. 2 shows a front view of three product carriers each carrying an article.

From the wheel arrangement 2 hangs an uppermost part 3 of the product carrier in the shape of a rod, which rod by its uppermost horizontal bent part makes the shaft of the wheel arrangement 2. At its lowermost part the rod 3 is bent in the shape of a hook 4 on which different kinds of articles may be suspended. Above the hook 4 a plate 5 and a spacer 6 have been arranged. The plate 5 hangs downward from this point. Its length and width are determined by practical reasons. The spacer 6 can, as shown in FIG. 1, have different lengths and it is attached to the upper edge of the plate 5. The plate 5 may be attached to the rod 3 by means of screws or the like and the spacer 6, which suitably consists of foamed plastics, may be glued to the plate 5. The spacer 6 extends in the present case over the whole width of the plate 5, as shown in FIG. 2, but this is per se not necessary. The spacer may also be arranged elsewhere on the plate, for example at the lower edge, but for practical reasons it has been arranged as shown in FIGS. 1 and 2. The plate 5 may consist of any suitable material, preferably of shock-absorbing material, such as hard foam plastics or plastics or of fiber board. The spacer 6 may also consist of this material or of some other light and preferably shock-absorbing material.

FIG. 2 shows the product carrier when it is used for suspending three different articles, namely a dress to the left, a cable roll in the middle and a wheel to the right. The dress and the wheel are simply suspended on the hooks 4, whereas the cable roll 7 has been suspended on two hooks 8. These hooks 8 may be fastened directly on the plate 5 or arranged on a rail 9 which in its turn is screwed to the plate 5. The hooks 8 can then be moved on the rail 9 so that it is possible to suspend cable rolls of different lengths as desired.

By the present invention a product carrier for sensitive products has accordingly been obtained which in a simple way provides careful transport and storing of these sensitive products in a transport track and suitable releasing of the products therefrom. The product carrier can also be used as a table at a working station where the product carrier may be given a horizontal position without the need of being removed from the transport track.

The invention is not limited to the above shown embodiment but it can be varied in different ways within the scope of the claims.

I claim:

1. A product carrier for transporting a product along a track, including:
    a) suspending means for suspending said product from said track;
    b) transporting means for transporting said suspending means in a direction of travel along said track;
    c) a protecting plate associated with said suspending means for protecting said product and extending vertically alongside said product to act as a barrier protecting said product from an adjacent product of an adjacent product carrier; and
    d) a spacer element projecting from said protecting plate for maintaining said protecting plate in a spaced relation from an adjacent product carrier so as to protect said product from said adjacent product and said adjacent product carrier.

2. The product carrier of claim 1, wherein said suspending means comprises an elongated member having an upper end in operative engagement with said transporting means and a lower end connected to said protecting plate, said product being carried on said lower end.

3. The product carrier of claim 2, wherein said transporting means is for use on a sloping track.

4. The product carrier of claim 2, wherein said lower end of said elongated member comprises a first hook for carrying said product thereon.

5. The product carrier of claim 4, including at least one hook in addition to said first hook attached to said protecting plate for carrying said product thereon.

6. The product carrier of claim 2, wherein said spacer element comprises a foam plastic element attached to said protecting plate.

7. The product carrier of claim 6, wherein said foam plastic element is glued to said protecting plate.

8. The product carrier of claim 2, wherein said transporting means includes at least one wheel operatively connected to said upper end of said elongated member for translation in said direction of travel.

9. A product carrier for carrying a product, including:
    a) suspending means for suspending said product;
    b) transporting means for transporting said suspending means in a direction of travel;
    c) a protecting plate associated with said suspending means for protecting said product; and
    d) a spacer element projecting from said protecting plate for maintaining said protecting plate in a spaced relation from an adjacent product carrier so as to protect said product from said adjacent product carrier;
    e) said suspending means comprising an elongated member having an upper end in operative engagement with said transporting means and a lower end connected to said protecting plate, said product being carried on said lower end;
    f) said elongated member being connected to said protecting plate so that said protecting plate is disposed in a plane transverse to said direction of travel.

* * * * *

UNITED STATES PATENT AND TRADEMARK OFFICE
CERTIFICATE OF CORRECTION

PATENT NO. : 5,988,072
DATED : November 23, 1999
INVENTOR(S) : Davidsson

It is certified that error appears in the above-identified patent and that said Letters Patent is hereby corrected as shown below:

Title page, item [57], Abstract: "suspending said" should read -- suspending the--.

Column 1, line 41, "disadvantage" should read --disadvantage, --

Signed and Sealed this

Twenty-fifth Day of July, 2000

Attest:

Q. TODD DICKINSON

*Attesting Officer*  *Director of Patents and Trademarks*